United States Patent [19]

Weisburn

[11] Patent Number: 5,375,712
[45] Date of Patent: Dec. 27, 1994

[54] SECURITY CONTAINER WITH A KEY

[75] Inventor: James T. Weisburn, Massillon, Ohio

[73] Assignee: Alpha Enterprises, Inc., Canton, Ohio

[21] Appl. No.: 951,002

[22] Filed: Sep. 25, 1992

[51] Int. Cl.⁵ .......................................... B65D 85/672
[52] U.S. Cl. ..................................... 206/387; 206/1.5; 292/288; 292/152
[58] Field of Search ............... 206/1.5, 387, 472, 807; 70/63, 159–162; 292/152, 156, 162, 288, 302, DIG. 50

[56] References Cited

U.S. PATENT DOCUMENTS

| | | | |
|---|---|---|---|
| 2,873,659 | 2/1959 | Bing et al. | 95/13 |
| 3,933,381 | 1/1976 | Schurman | 292/57 |
| 3,958,125 | 5/1976 | Zechmair et al. | 292/162 |
| 4,153,178 | 5/1979 | Weavers | 220/306 |
| 4,184,594 | 1/1980 | Hehn | 206/387 |
| 4,390,198 | 6/1983 | Selinko | 292/152 |
| 4,469,225 | 9/1984 | Takahashi | 206/1.5 |
| 4,589,549 | 5/1986 | Hehn | 206/387 |
| 4,966,020 | 10/1990 | Fotheringham et al. | 70/63 |

Primary Examiner—Paul T. Sewell
Assistant Examiner—Thomas P. Hilliard
Attorney, Agent, or Firm—Michael Sand Co.

[57] ABSTRACT

A security container for storing various articles is formed with a groove along one edge of a cover which extends parallel with a similar groove formed on a base of the container, when the cover is in a closed position on the base. A generally U-shaped slide latch is slidably removably mounted in the spaced grooves for movement therealong between locked and unlocked positions. A plurality of projections on the slide latch engage flexible tabs on the base to secure the slide latch in locked position upon an open end of the slide latch reaching a stop formed on an end of the base. A manually operated key has tangs which are inserted through openings formed in the slide latch to disengage the flexible tabs from the projections, permitting the slide latch to be slidably removed from the container grooves enabling the cover to be opened from the base. The locking projections and flexible tabs are in a stepped offset relationship to enable the projections to move past the tabs once released from engagement therewith.

20 Claims, 5 Drawing Sheets

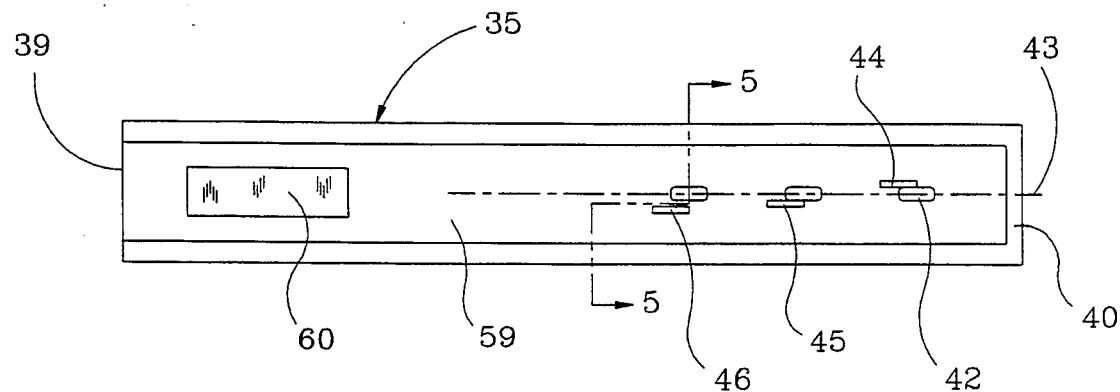
FIG. 4
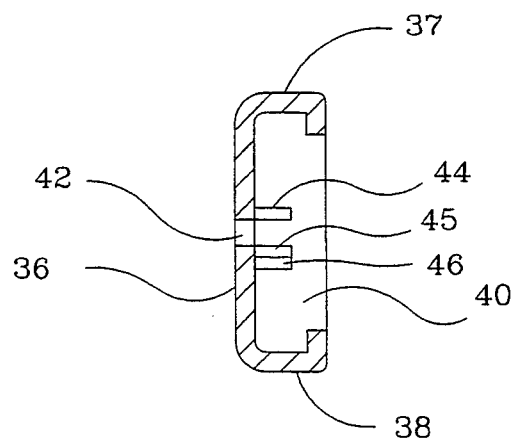
FIG. 5
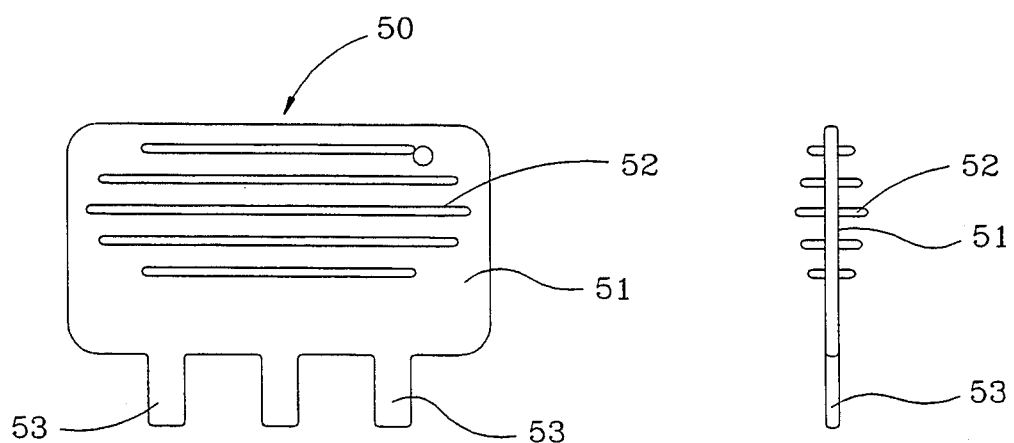
FIG. 6
PRIOR ART
FIG. 7
PRIOR ART

SECURITY CONTAINER WITH A KEY

BACKGROUND OF THE INVENTION

1. Technical Field

The invention relates to containers and in particular, to a container for storing various articles including video and audio cassettes. More particularly, the invention relates to such a storage container which can be securely locked in a closed position preventing the unauthorized removal of the contents thereof until a store clerk or owner of the container, removes a locking slide latch by a manually-operated key.

2. Background Information containers, and in particular, lightweight inexpensively molded plastic containers, are used for a variety of purposes and for the storage of various articles. One use of such plastic containers is for the storage of video and audio cassettes for both display and sale, as well as for home storage. One particular use of such plastic storage containers, which preferably are formed of a transparent material, is the display of a video or audio cassette at a retail store. However, it is desirable that the container be locked to prevent the unauthorized removal of the cassette therefrom, thereby preventing its unauthorized removal from the store. Many of these containers will contain an E.A.S. tag (electronic article surveillance) located inside the container which will sound an alarm should the thief attempt to remove the container and tape from the store past a security check point.

The present invention provides an inexpensive plastic case for storing various articles, such as video and audio cassettes therein, which will be contained in a secured locked position preventing the unauthorized removal of the cassette, E.A.S. tag or other object from the within the security container, until the container has been unlocked and opened by authorized personnel.

Various containers for storing articles, including cassettes, have been provided with various types of locking mechanisms that include a slide latch. Some examples of containers using slide latches are shown in U.S. Pat. Nos. 2,873,659, 3,933,381 and 4,153,178. However, none of these slide latches are provided with locking means to prevent the unauthorized removal or opening of the container, since they are used only for keeping the lid in a closed position, and not for locking the cover or lid in a secured locked position as that of the present invention.

Therefore, the need exists for an improved storage container, preferably formed of an inexpensive lightweight transparent plastic, which can be used to hold a variety of articles such as audio and video cassettes, and in which the cover can be secured in a locked position requiring opening of the locking mechanism by a specially designed key, which key is maintained in the possession of authorized personnel. There is no such security container of which I am aware which accomplishes these results.

SUMMARY OF THE INVENTION

Objectives of the invention include providing an improved storage container which preferably is formed of a transparent, lightweight molded plastic, which can be mass produced relatively inexpensively, and which is provided with a rigid locking slide plate or latch which secures the cover of the security container in a locked position until the slide plate is moved to an unlocked position by use of a specially configured key by authorized personnel.

Another objective of the invention is to provide such a security container which may contain a pair of tape reel retaining hubs so as to securely position a cassette within the container, enabling it to be displayed at a retail store without fear of theft.

A still further objective of the invention is to provide such a security container which uses a simple rigid plastic slide member to secure the cover in a locked position to prevent unauthorized opening of the container, and which is unlocked and slid to an open position by the simple manual manipulation of an inexpensive plastic injection molded key.

Another objective of the invention is to provide such a security container which can be mass produced relatively inexpensively by plastic molding procedures, which is of a transparent plastic material to enable the contents to be readily visible, which provides both physical and theft protection to an article stored within the container; and which provides a relatively dust free container for storing and displaying an article.

Another objective of the invention is to provide such a security container in which an E.A.S. tag may be attached to an inside surface of the slide member to prevent theft until the slide member is removed at a checkout counter by a clerk.

These objectives and advantages are obtained by the improved security container of the invention, the general nature of which may be stated as including a base and a cover hingedly connected to one another for movement between open and closed positions; a groove formed on each of the cover and on the base which provide a pair of spaced parallel grooves when the cover is in closed position on the base; a lock plate slidably mounted in the parallel grooves to maintain the cover in closed position and movable between locked and unlocked positions; flexible tabs formed on one of the base and cover and locking projections formed on the other of said base and cover and engageable with each other, for releasably securing the lock plate in the locked position; and key means engageable with the flexible tabs for moving said tabs out of engagement with the projections enabling the lock plate to be moved from locked to unlocked position.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 4 is a bottom plan view of the slide latch removed from the security container;

FIG. 5 is an enlarged sectional view taken on line 5—5, FIG. 4;

FIG. 6 is a plan view of the unlocking key for the security container;

FIG. 7 is a right hand side elevational view of the key of FIG. 6;

Similar numerals refer to similar parts throughout the drawings.

DESCRIPTION OF THE PREFERRED EMBODIMENT

Figure 1:
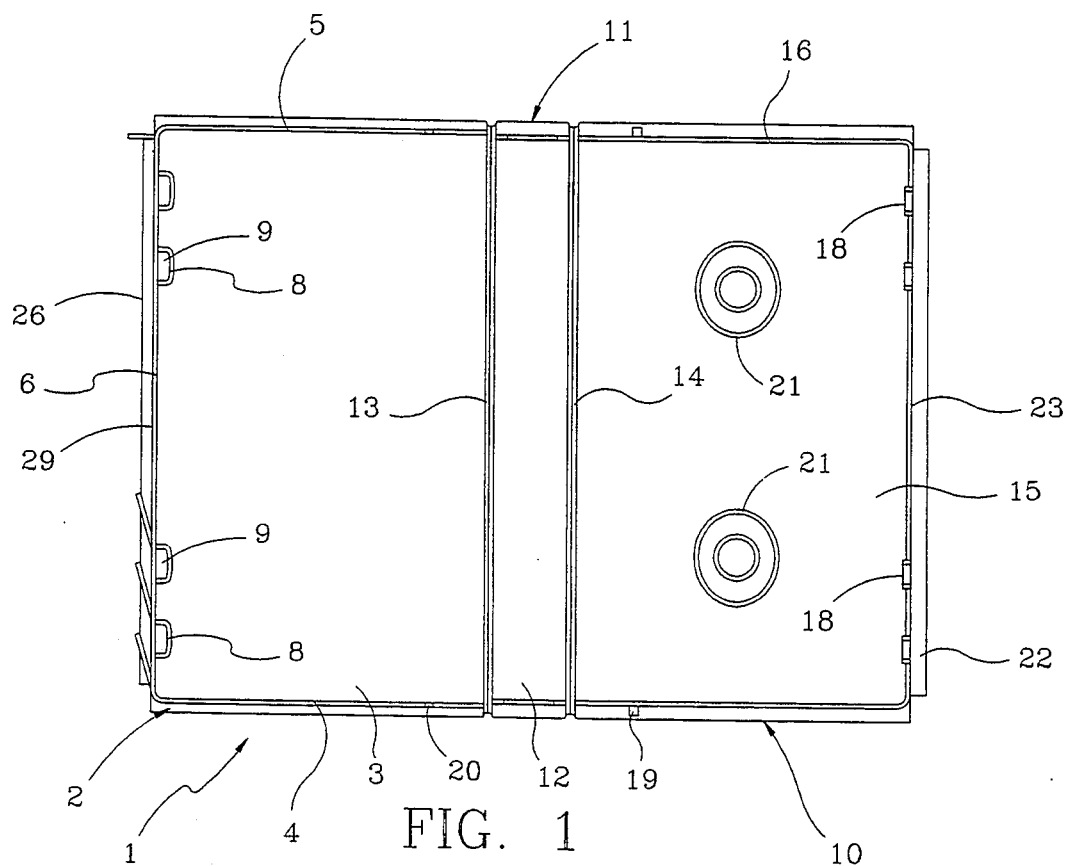
FIG. 1 is a top plan view of the storage container in full open position, with the slide latch removed.

The storage container of the present invention is indicated generally at 1, and is shown in FIG. 1 in a full open position. Container 1 has a rectangular box-shaped configuration and forms a hollow storage compartment when closed, and preferably is molded of a transparent plastic material, such as polypropylene. Container 1 includes a three-sided base indicated generally at 2, having a rectangular-shaped flat bottom wall 3 with upstanding parallel end walls 4 and 5 and a front wall 6. Walls 4, 5 and 6 are formed integrally with bottom wall 3 and are arranged in a U-shaped configuration to enclose three sides of bottom wall 3. Walls 4–6 preferably are positioned inwardly a short distance from the outer edge of bottom wall 3. Two pairs of tab receiving hollow members 8 are formed on the inner surface of front wall 6 and are provided with top openings 9.

A flat rectangular-shaped lid or cover indicated generally at 10, is hingedly movably mounted on bottom wall 3 by a double hinge panel assembly indicated generally at 11. Hinge assembly 11 includes an elongated rectangular-shaped panel 12 formed of plastic material, which is connected to the inner edges of bottom wall 3 and cover 10 by living hinges 13 and 14. Cover 10 includes a flat rectangular-shaped top closure wall 15, similar in size and configuration to bottom wall 3. A U-shaped flange 16 is formed integrally with top wall 15 and projects outwardly from the inside surface thereof and preferably is spaced a short distance inwardly from the outer edges of the top wall.

Figure 2:
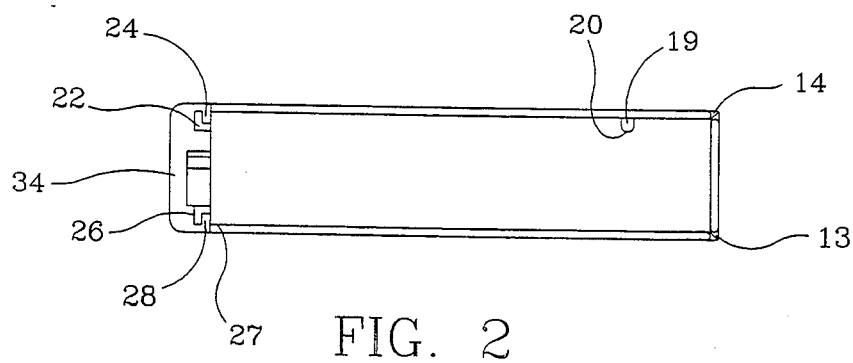
FIG. 2 is an end elevational view of the storage container of FIG. 1 in closed position, with the slide latch removed.
Figure 3:
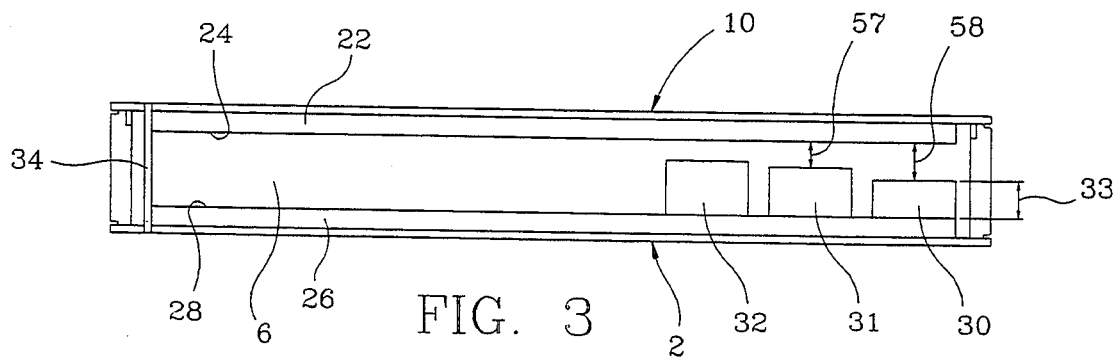
FIG. 3 is a front left hand elevational view of the closed storage container of FIG. 2.

Two pairs of spaced tabs 18 are formed on an inside portion of flange 16 and are adapted to frictionally engage tab receiving members 8 when inserted through openings 9 thereof, to secure cover 10 in a closed position on base 2 as shown in FIGS. 2 and 3. A pair of guide tabs 19 also may be formed on flange 16 and are received within U-shaped notches 20 formed in end walls 4 and 5 of base 2, when the cover is in closed position.

The particular construction of base 2 and cover 10 is similar to that used for storage containers for video and audiocassettes, such as shown in U.S. Pat. No. 4,184,594. When used for storing such cassettes, a pair of reel retaining members 21 preferably are formed integrally on an inner surface of top wall 15 for projecting into the reel openings of the video or audiocassette. However, container 1 may contain other retaining members within the storage compartment, or be completely free of any such members without affecting the concept of the invention. Also, container 1 may be used for retaining other articles and need not be limited to storing cassettes.

In accordance with the invention, an L-shaped member 22 is formed integrally along edge 23 of cover 10 (FIGS. 1 and 2) and forms a U-shaped channel 24 which extends along the length of edge 23 of top wall 15. A similar L-shaped member 26 is formed integrally with front wall 6 of base 2 and extends along edge 27 thereof, to form another U-shaped channel 28. L-shaped members 22 and 26 preferably are molded integrally with cover 10 and base 2, respectively. Edge 27 is opposite and parallel with a top edge 29 of front wall 6, which edge 29 abuts and mates with cover edge 23 when cover 10 is in the closed position.

In further accordance with the invention, a plurality of flexible tabs 30, 31 and 32 (FIG. 3) are formed integrally with front wall 6 of base 2 and are located adjacent end wall 4 and are inclined toward opposite end wall 5. As shown in FIG. 3, tabs 30–32 vary in width to form a step-like configuration along front wall 6. The width of tab 30 is indicated at 33 in FIG. 3.

A stop 34 is formed on front wall 6 at the junction with end wall 5 by a projection which is formed integrally with front wall 6. Stop projection 34 also closes the end of L-shaped member 26.

Figure 8:
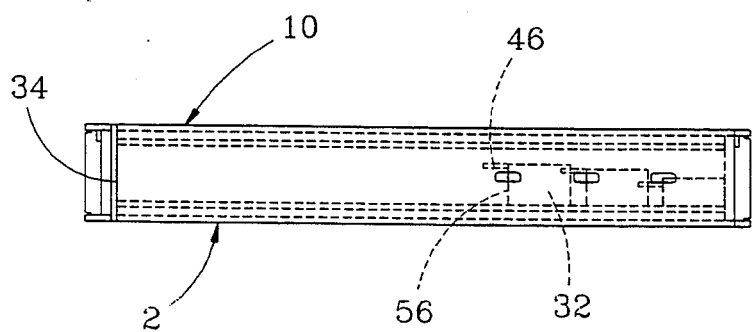
FIG. 8 is a front elevational view similar to FIG. 3, with the slide latch mounted thereon and in locked position.
Figure 9:
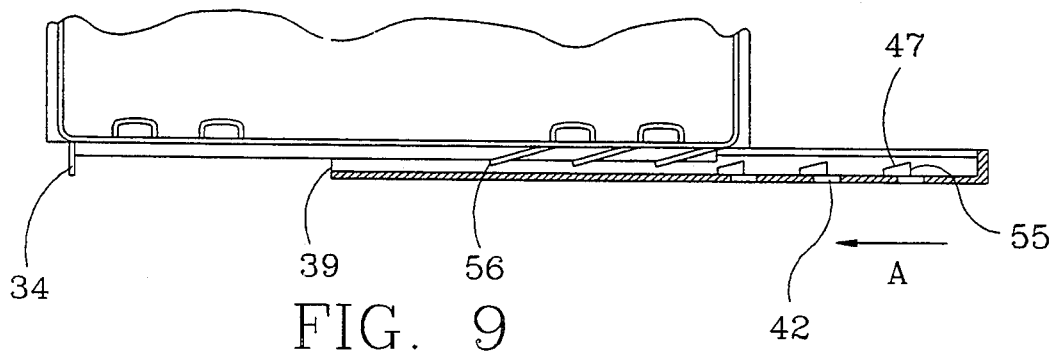
FIGS. 9, 9A and 9B is a series of sectional views showing movement of the slide latch from the unlocked position of FIG. 9 to the fully locked position of FIG. 9B.
Figure 9A:
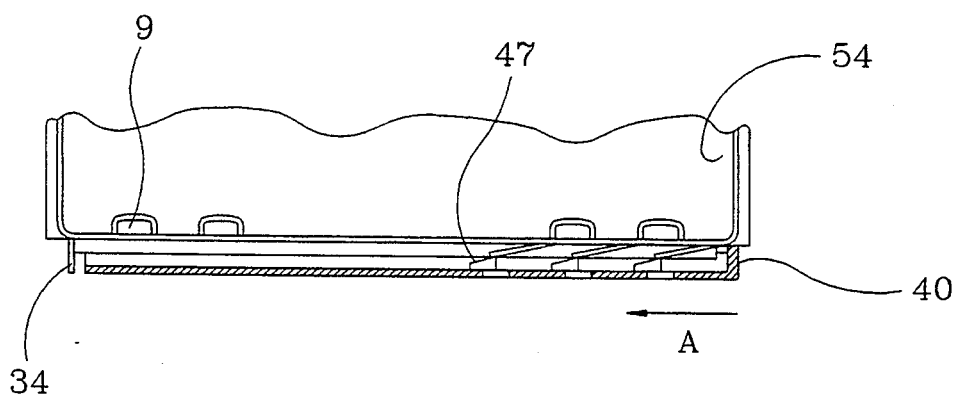
Figure 9B:
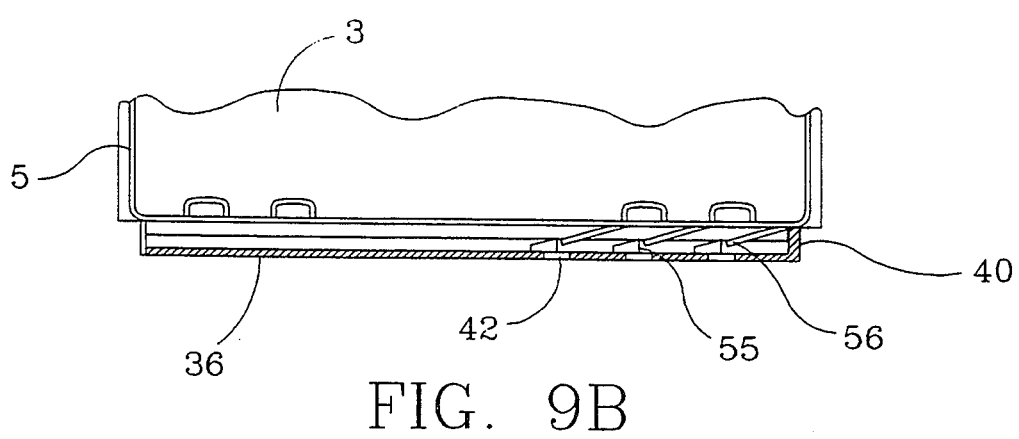
Figure 10:
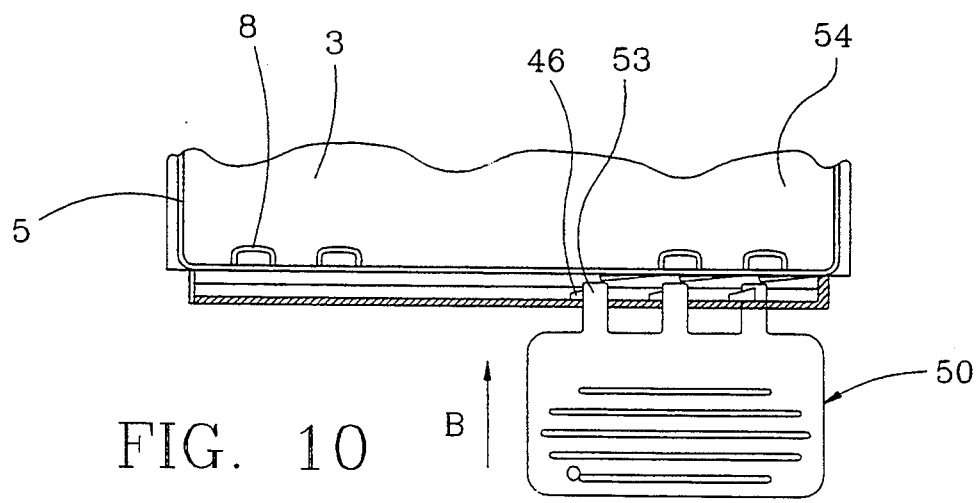
FIG. 10 is a sectional view similar to FIG. 9B showing the key tangs depressing the flexible locking tabs when the slide latch is in locked position.

In further accordance with the invention, a slide latch or slide lock indicated generally at 35 (FIGS. 4 and 5), is provided for securing cover 10 in a closed locked position as shown in FIGS. 8, 9B and 10. Slide latch 35 preferably is formed of a rigid plastic material as a one or two piece member. Latch 35 has a main flat wall 36 and a pair of spaced parallel, inturned side walls 37 and 38, which provide a U-shaped cross-sectional configuration to the slide latch. One end 39 of slide latch 35 is open, with the opposite end being closed by an end wall 40.

A plurality of key receiving openings 42, three of which are shown in the particular slide latch embodiment shown in the drawings, are formed through main wall 36 and are in alignment with the axial centerline 43 of the slide latch.

Figure 10A:
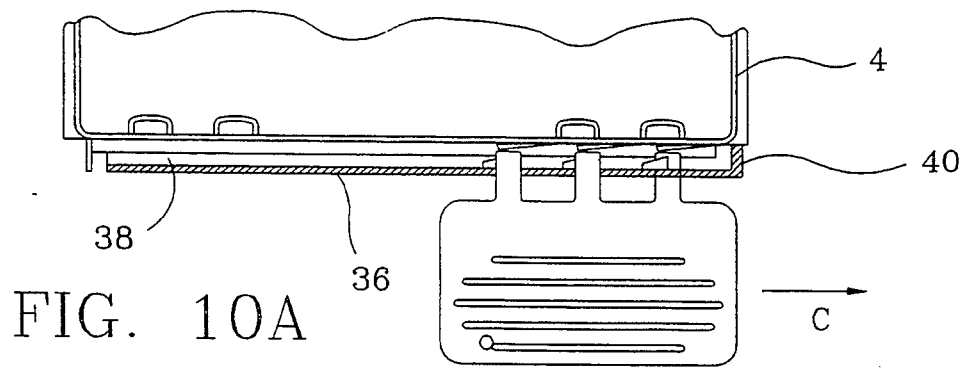
FIGS. 10A and 10B are sectional views similar to FIG. 10 showing the slide latch moving towards the unlocked position of FIG. 10B.
Figure 10B:
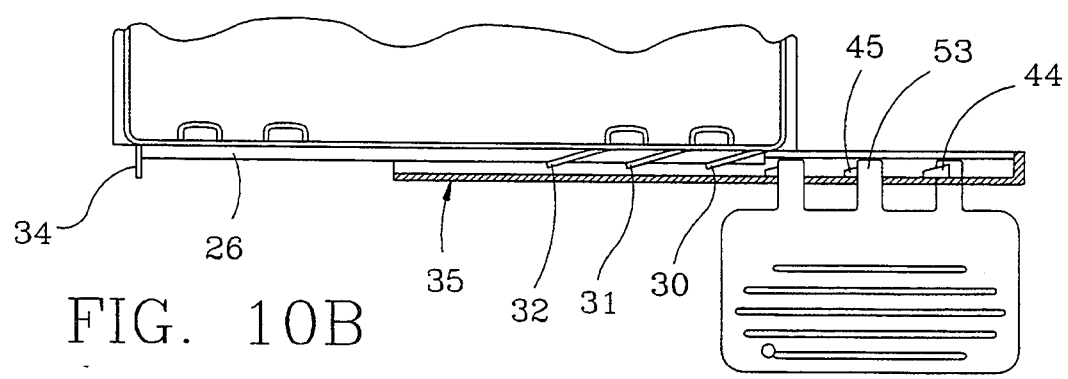

In still further accordance with the invention, a plurality of locking projections 44, 45 and 46 are formed integrally with the inside surface of main wall 36 and project outwardly therefrom, and terminate in inclined top surfaces 47, as shown particularly in FIGS. 9–10B. As shown in FIG. 4, each of the projections 44–46 are located adjacent a respective one of the key openings 42, and slightly forwardly thereof. Projection 44 is located on one side of axial centerline 43 with the other two projections 45 and 46 being located on the opposite side of axial centerline 43 and at different distances therefrom, the purpose of which is discussed more fully below.

One type of manually operated key which may be used with the security container of the present invention, is indicated generally at 50, and is shown in FIGS. 6 and 7. Key 50 preferably is a one piece molded rigid plastic member having a main body 51, formed with a plurality of reinforcing ribs 52, and has a plurality of outwardly projecting tangs 53 thereon. Such a key is shown in U.S. Pat. No. 4,589,549.

The operation and manner of use of security container 1 is best shown in FIG. 8 through FIG. 10B. After placement of an article, such as a video or audio tape (not shown) into the interior storage compartment 54 formed by base 2 and cover 10, cover 10 is hingedly moved to a closed position as shown particularly in FIGS. 2 and 3. In this closed position, edges 23 and 29 generally align and abut with each other, with L-shaped members 22 and 26 extending in a parallel spaced relationship, providing a pair of parallel U-shaped channels 24 and 28. Tabs 18 will project through top openings 9 of tab receiving members 8, to frictionally secure cover 10 in a closed position on base 2.

To secure cover 10 in a closed locked position, slide latch 35 is slidably engaged and moved along L-shaped members 22 and 26 by inserting open end 39 of the slide lock into sliding engagement with the open ends of the U-shaped channels at the right hand side of the container as illustrated in FIG. 3, opposite of stop 34. Slide latch 35 is manually moved from the open end of the spaced L-shaped members toward stop member 34 as shown by arrows A in FIGS. 9–9A. Locking projections 44–46, and in particular sloped top surfaces 47 thereof, slide freely and easily over flexible tabs 30–32, easily depressing the tabs due to the flexibility of the tabs and the sliding engagement with tapered surfaces 47 of the projections.

Slide latch 35 is continually moved to the left in the direction of arrow A (FIGS. 9–9A) until open end 39 of slide latch 35 abuts stop 34. At this position, end wall 40 of slide latch 35 will engage the open ends of L-shaped members 22 and 26 adjacent end wall 4, placing slide latch 35 in a completely locked position, preventing opening of cover 10 from base 2, due to the engagement of inturned ends 37 and 38 of slide latch 35 within channels 24 and 28 formed by L-shaped members 22 and 26. Slide latch 35 is prevented from moving to the right or unlocked position as shown in FIG. 9B, due to the engagement of the upstanding generally straight edges 55 of the locking projections with the extended ends 56 of the flexible locking tabs.

To unlock container 1, key tangs 53 are inserted through openings 42 of slide latch 35, which when in locked position are aligned with a respective end of flexible tabs 30–32 as shown in FIG. 10. Depression of key 50 in the direction of arrow B will cause tangs 53 to depress the flexible tabs as shown in FIG. 10A, out of engagement with projections 44–46. Manual movement of key 50 toward the unlocked position as shown by arrow C in FIG. 10A, will move slide latch 35 therewith, and will move the rigid locking projections 40–46 past the depressed flexible tabs 30–32, until they are clear from engagement therewith, as shown in FIG. 10B. The slide latch then is completely removed from engagement with the L-shaped members, enabling the lid to be moved from the closed position of FIGS. 2 and 3, to the open position of FIG. 1. This opening movement is also shown in FIGS. 8–8C, without key 50 being shown.

Figure 8A:
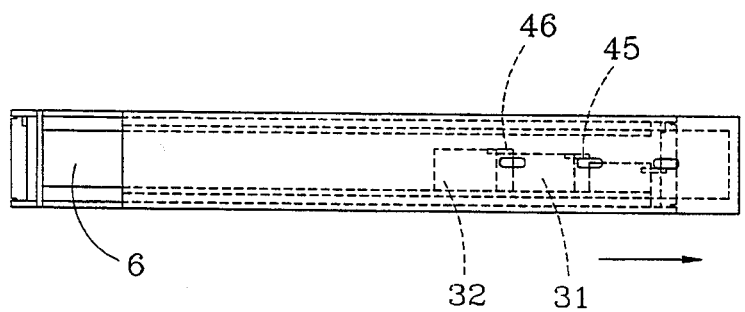
FIGS. 8A, 8B and 8C are elevational front views similar to FIG. 8, showing unlocking of the container as the slide latch moves from the locked position of FIG. 8 to the unlocked position of FIG. 8C.
Figure 8B:
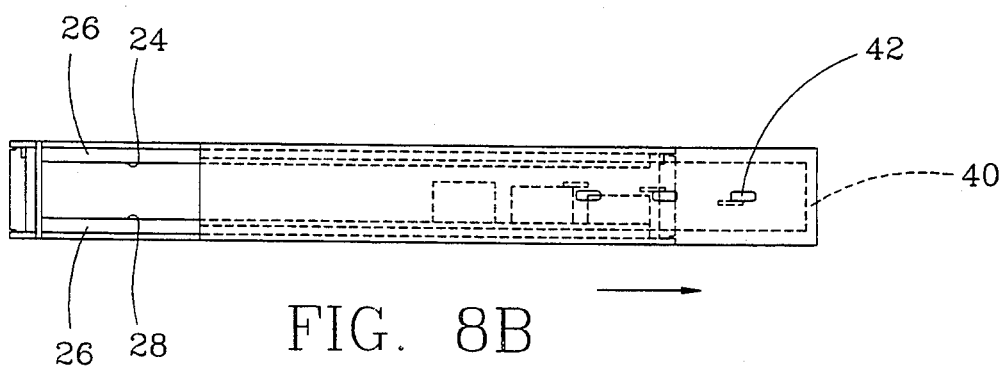
Figure 8C:
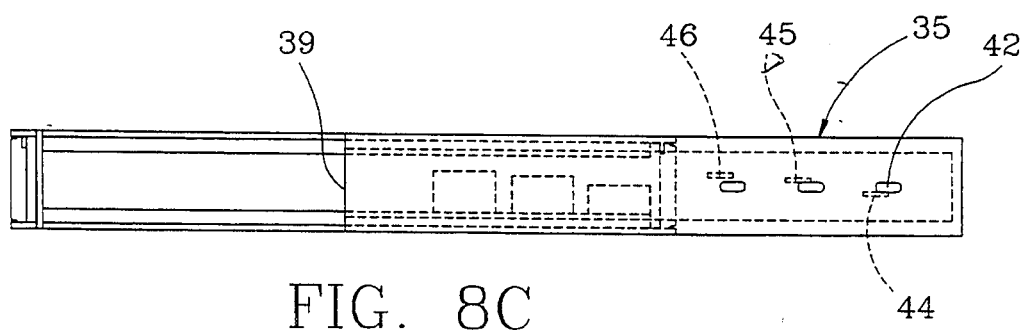

In accordance with another of the features of the invention, the stepped configuration of flexible tabs 30–32 and the offset relationship of locking projections 44–46 enable key tangs 53 to project through key openings 42 and into engagement with the respective locking tabs, as shown particularly in FIGS. 8–8C to depress the same, until the particular projection has slid past the extended edge 56 of the forwardmost flexible tab, whereupon the projection will slide freely past the following flexible tabs the spaces provided by the stepped configuration as shown by numerals 57 and 58 in FIG. 3, enabling the slide latch to be moved from the locked position to the unlocked position.

As shown in FIG. 8, the key openings are aligned with a respective forward edge 56 of each of the tabs so that the key tangs when inserted therethrough will engage and depress the tangs as shown particularly in FIG. 10, enabling the slide plate to begin its movement toward the right or open position as shown in FIGS. 8A–8C.

As shown in FIG. 8A, after frontmost projection 46 has moved past the retaining edge 56 of tab 32, it will be out of alignment with the next flexible tab 31, which also has been disengaged from the straight edge 55 of projection 45, since its depressing key tang also has moved out of engagement therewith. As shown in FIG. 8B, the projections then are out of the path of engagement with the flexible tabs due to spacings 57 and 58 provided by the stepped configuration of tabs 30–32 so as not to interfere with the movement of the projections once the straight edges 55 of the various projections have moved past the retaining edges 56 of the flexible tabs. It is this stepped configuration of the widths of the flexible tabs, in combination with the stepped-like configuration of the projections, as best shown in FIG. 4, that enables the projections to move linearly past the flexible tabs after initially depressing the flexible tabs by the key tangs. This permits the slide latch to be moved together with the key, freely toward the unlocked position of FIGS. 8C and 10B in a simple sliding movement, after which the slide latch is completely removed from its engagement with the L-shaped members.

Thus, once tangs 53 of key 50 are inserted through slide latch openings 42 and the leading edges 56 of flexible projections 30–32 are depressed and the slide latch moved a slight amount toward the unlocked position so that the straight edges 55 of the projections move beyond the retaining edges 56, the key merely then functions as a sliding member to facilitate the movement of the slide latch to the full open and removed position.

If desired, various notches could be formed in either or both of the L-shaped members 22 and 26 and in the slide latch, to enable the slide latch to remain on the container after being moved to an unlocked position, enabling cover 10 to be moved to the open position, without complete removal of the slide latch. However, the complete removal of the slide latch is preferred, since the same can be removed in a single, simple operation by the movement of the key which carries with it the slide latch. To relock the security container, it requires only the insertion of open end 39 of the slide latch onto the aligned open ends of the two L-shaped members and the U-shaped channels formed thereby, and manual sliding movement of the slide latch from the position of FIG. 8C to the position of FIG. 8. Projections 44–48 click past the flexible tabs, depressing the same as they move toward the locked position.

If desired, key 50 could be mounted in a fixed position as in a stationary support, such as shown in U.S. Pat. No. 4,589,549 without effecting the invention.

In accordance with another feature of the invention, an E.A.S. tag 60 (FIG. 4) may be secured to the inside surface 59 of slide latch 35 to prevent unauthorized removal of container 1 until the slide latch has been removed by authorized personnel. This will enable the stored article such as a videocassette, to remain in container 1 and be removed from the store premises, such as a video rental store by the customer, after removal of the slide latch. This enables container 1 to function both as a security container as well as a transport and storage container for a videocassette or other article, requiring only removal of the slide latch containing the protective E.A.S. tag by an authorized personnel.

Although flexible tabs 30-32 are indicated as being formed on front wall 6 of base 2, and projections 44-46 being formed on slide latch 35, it is easily recognized that these two components could be reversed whereby the flexible tabs are formed on the inside surface of the slide latch and the abutting projections are formed on the sidewall of the container, without affecting the concept of the invention.

Furthermore, although the stepped configuration of flexible tabs 30-32 enables the slide latch to be removed in a single sliding movement after insertion of the key tangs into engagement with the tabs, it is readily seen that tabs 30-32 could have the same width, which would require three separate depressions and three separate unlocking sliding movement of the key and slide latch, to remove the slide latch from the storage container. Although the stepped arrangement of the flexible tabs is preferred due to the ease of removing slide latch 35 therefrom, the three separate key depressions and movements could be utilized, without affecting the concept of the invention.

Accordingly, the security container is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved security container is constructed and used, the characteristics of the construction, and the advantageous, new and useful results obtained; the new and useful structures, devices, elements, arrangements, parts and combinations, are set forth in the appended claims.

I claim:

1. In combination, a security container and key means for unlocking said container, said container including:
    a base and a cover hingedly connected to one another for movement between open and closed positions;
    a slide latch having a main wall and a pair of side walls forming a generally U-shaped cross-sectional configuration, said latch being slidably mounted in grooves formed in the cover and base for movement along the grooves between locked and unlocked positions;
    a plurality of flexible tabs formed on and spaced along one of the base and slide latch; along one of the base and slide latch;
    a plurality of locking projections formed on the other of the base and slide latch, said locking projections being engageable with the flexible tabs to secure the slide latch in locked position to prevent movement of the cover from closed position toward the open position; and
    a plurality of key-receiving openings formed in the main wall of the slide latch for insertably receiving the key means therein for engagement with the flexible tabs when the slide latch is in locked position, for disengaging said flexible tabs from the projections, to enable the slide latch to be moved from locked position to unlocked position.

2. The combination defined in claim 1 in which the flexible tabs are formed on the base and are inclined toward one end of the base and are located adjacent the groove of the base and have a predetermined width extending from the groove toward the mating edge of said base; in which the widths of said tabs increase progressively toward said one end of the base; and in which the locking projections are formed on an inside surface of the main wall of the slide latch.

3. The combination defined in claim 1 including stop means formed on the said one end of the base for engaging the slide latch upon said latch reaching the locked position.

4. The combination defined in claim 2 in which the slide latch projections have tapered top surfaces tapered in the same direction as the inclined flexible tabs so as to slide freely past the tabs when moving toward the locked position.

5. The container defined in claim 2 in which the slide latch has an axial centerline; and in which certain of the slide latch projections are on opposite sides of said axial centerline.

6. The container defined in claim 5 in which the key receiving openings are aligned with the axial centerline of the slide latch.

7. The container defined in claim 3 in which the slide latch has an open end for slidably inserting said latch into the grooves, and an opposite closed end for engaging the base upon the open end of said latch reaching the stop means.

8. The container defined in claim 1 in which an electronic article surveillance tag is mounted on an inside surface of the main wall of the slide latch.

9. The container defined in claim 1 in which the key means is formed with a plurality of outwardly projecting tangs adapted to be inserted through the key receiving openings for moving the flexible tabs out of locking engagement with the locking projections.

10. The combination defined in claim 1 in which engageable latch means is formed on the base and on the cover for maintaining the cover in a closed position on the base.

11. The combination defined in claim 1 in which the base includes a bottom wall, a pair of spaced parallel end walls and a front wall; and in which the flexible tabs are mounted on the front wall of the base and are located closely adjacent one of the end walls.

12. The combination defined in claim 11 in which the locking projections are mounted on an inside surface of the main wall of the slide latch; in which an L-shaped member is formed on the front wall of the base and extends along an edge of said front wall and forms the base groove therewith; and in which the flexible tabs each have a different width extending away from the L-shaped member toward the mating edge to provide a stepped configuration along which the slide latch projections move when moving from the locked position toward the unlocked position.

13. The combination defined in claim 1 in which the slide latch is formed of a rigid plastic material.

14. In combination, a security container and key means detached from the container for unlocking said container, said container including:
- a base and a cover hingedly connected to one another for movement between open and closed positions;
- a groove formed on each of the cover and on the base which provide a pair of spaced parallel grooves when the cover is in closed position on the base;
- a lock plate slidably mounted in the parallel grooves to maintain the cover in closed position, said lock plate being movable between locked and unlocked positions; and
- flexible tabs formed on one of the base and lock plate, and locking projections formed on the other of said base and lock plate and engageable with the flexible tabs for releasably securing the lock plate in the locked position; said key means being engageable with the flexible tabs for moving said tabs out of engagement with the projections enabling the lock plate to be moved from locked to unlocked position.

15. The combination defined in claim 14 in which the flexible tabs are in a stepped relationship along a wall of the base; and in which the locking projections are in a stepped relationship along the lock plate.

16. The combination defined in claim 14 in which stop means is formed on the base and is engaged by the lock plate upon said lock plate reaching the locked position.

17. The combination defined in claim 14 in which the lock plate is movably mounted on the cover and base; and in which the lock plate is U-shaped in cross section having a main wall and a pair of inturned side walls which extend into the spaced parallel grooves to maintain the cover in closed position on the base.

18. The combination defined in claim 17 in which the locking projections are formed on an inner surface of the main wall of the lock plate and are located generally adjacent the key receiving openings which are formed through said main wall.

19. The combination defined in claim 16 in which the stop means is a projection extending outwardly from a wall of the base located between the spaced parallel grooves when the cover is in the closed position; and in which the flexible tabs are formed on said base wall at an opposite end of the base from said stop means projection.

20. The combination defined in claim 17 in which the lock plate has a pair of opposed ends, one of which is open; and in which groove-forming portions of the base and cover pass through said open end of the plate for slidably removably mounting said plate on said groove-forming portions for securing the cover in the closed position on the base.

* * * * *